United States Patent
Hayashi et al.

(10) Patent No.: US 6,848,332 B2
(45) Date of Patent: Feb. 1, 2005

(54) SHIFT DEVICE AND SWITCH DEVICE THEREOF FOR VEHICLE

(75) Inventors: Masaki Hayashi, Aichi (JP); Yoshimasa Kunimatsu, Aichi (JP); Noriyasu Syamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 101 days.

(21) Appl. No.: 10/087,592

(22) Filed: Mar. 1, 2002

(65) Prior Publication Data

US 2002/0152827 A1 Oct. 24, 2002

(30) Foreign Application Priority Data

Mar. 1, 2001 (JP) .................................... 2001-057300
Mar. 2, 2001 (JP) .................................... 2001-058872

(51) Int. Cl.[7] ............................................ F16H 59/02
(52) U.S. Cl. ................................. 74/473.33; 74/473.21; 74/473.28

(58) Field of Search ...................... 74/473.21, 473.23, 74/473.28, 473.3, 473.33, 335

(56) References Cited

U.S. PATENT DOCUMENTS

| | | | | |
|---|---|---|---|---|
| 4,580,006 A | * | 4/1986 | Hull | .......................... 178/18.01 |
| 5,161,422 A | * | 11/1992 | Suman et al. | .................. 74/335 |
| 5,172,603 A | * | 12/1992 | MacInnis | ...................... 74/335 |
| 6,366,442 B1 | * | 4/2002 | Onodera | ...................... 361/179 |

FOREIGN PATENT DOCUMENTS

| | | | |
|---|---|---|---|
| JP | 10-16594 | * | 1/1998 |
| JP | 10-059132 | | 3/1998 |
| WO | WO 99/13246 | * | 3/1999 |

* cited by examiner

Primary Examiner—William C. Joyce
(74) Attorney, Agent, or Firm—Patterson, Thuente, Skaar & Christensen, P.A.

(57) ABSTRACT

A shift device has an operation member for operating a vehicular automatic transmission. The operation member is formed to conform to the shapes of a hand and fingers of a driver.

3 Claims, 10 Drawing Sheets

SHIFT DEVICE AND SWITCH DEVICE THEREOF FOR VEHICLE

BACKGROUND ART

The present invention relates to a vehicular shift device, more particularly to a shift-by-wire type shift device.

In a typical automobile having an automatic transmission, the shift lever of the transmission is manipulated to change the shift position. The shift lever protrudes into the passenger compartment and uses leverage for transmitting a predetermined amount of force.

A typical shift lever locking mechanism locks a shift lever at the parking position and does not permit the shift lever to be moved to another position unless the driver performs another operation such as pressing of the brake pedal. For example, Japanese Laid-Open Patent Publication No. 10-59132 discloses such a shift lever device. The shift lever of the device is reciprocated in a linear shift gate. One end of the gate is the parking position. When the shift lever is located at the parking position, an engaging projection formed on the shift lever engages with a lock pin, which is driven by an actuator. The engagement prevents the shift lever from being moved from the parking position.

Shift-by-wire type shift devices have also been applied in the field. A shift-by-wire type shift device converts a shifting operation of a shift lever into an electric shifting signal and operates an actuator with the signal. The actuator, in turn, switches a manual shift valve. However, since the shift lever projects into the passenger compartment, the lever may be unintentionally manipulated.

SUMMARY OF THE INVENTION

Accordingly, it is an objective of the present invention to provide a shift device that reduces the projection amount of a manipulation means into a passenger compartment and prevents unintended manipulation.

One embodiment of the present invention provides a shift device that includes an operation member for operating a vehicular automatic transmission, and the operation member is formed to fit the shapes of a palm and fingers of the driver.

Another embodiment of the present invention provides a shift device that includes an operation member for operating a vehicular automatic transmission. The shift device includes a case. The operation member includes a substantially dome-shaped knob. A part of the knob projects from the case (3).

A further embodiment of the present invention provides a switch device of a shift device that is used for selecting the engage state of a gear train in a vehicular automatic transmission. The switch device includes a resting portion, on which a driver puts a hand, and switch portion, which is manipulated by fingers when the driver rests a hand on the resting portion.

DETAILED DESCRIPTION OF THE PREFERRED EMBODIMENTS

First Embodiment

A selector device according to a first embodiment of the present invention will now be described with reference to FIGS. 1 to 6. The selector device is located on a floor console of a vehicle.

Figure 1:
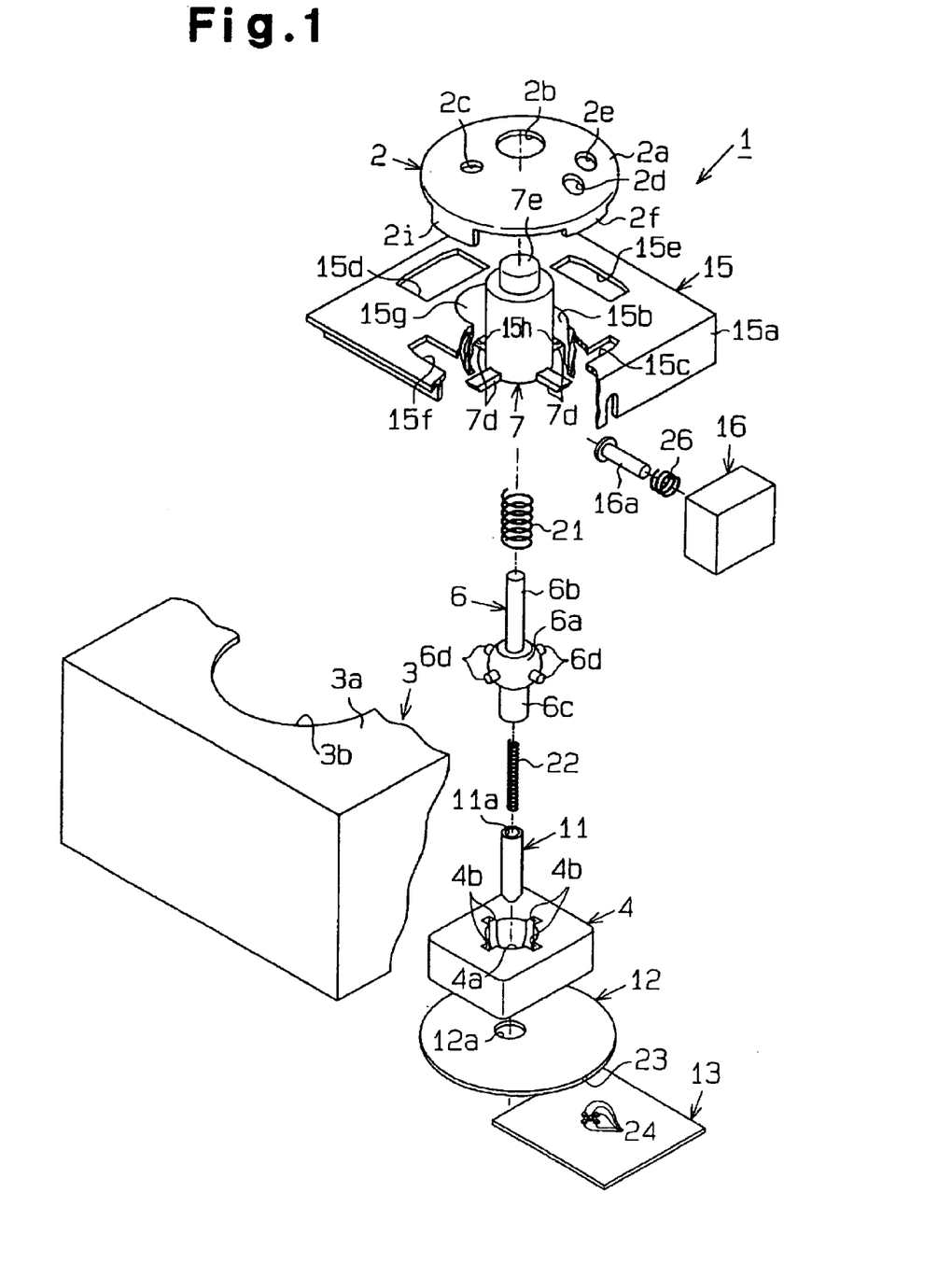
FIG. 1 is an exploded view, with a part cut away, illustrating a selector device according to a first embodiment.
Figure 2:
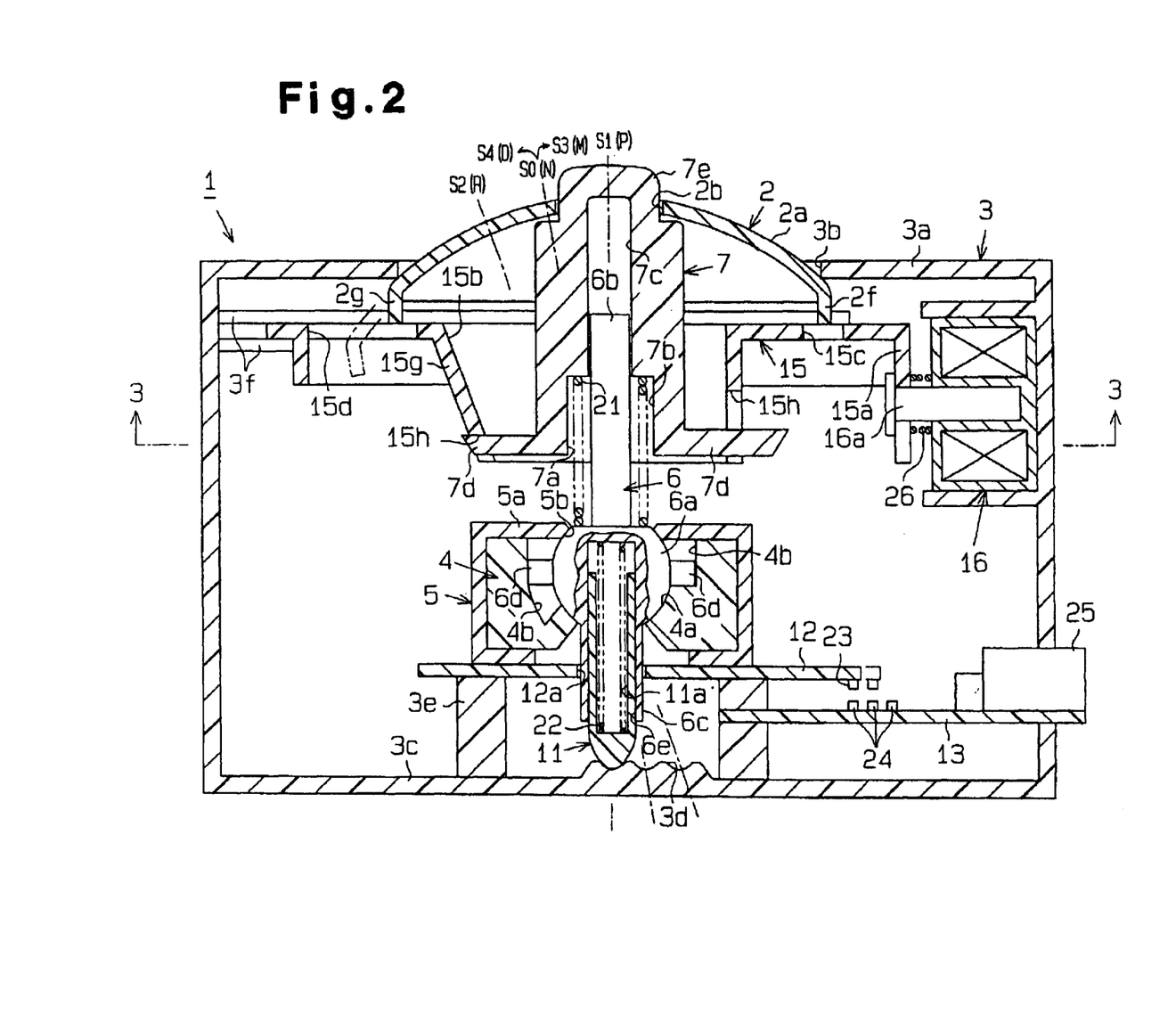
FIG. 2 is a cross-sectional view illustrating the selector device.
Figure 4A:
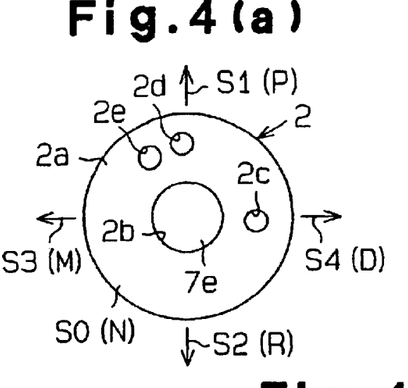
FIG. 4(a) is a plan view of a semispherical knob.
Figure 4B:
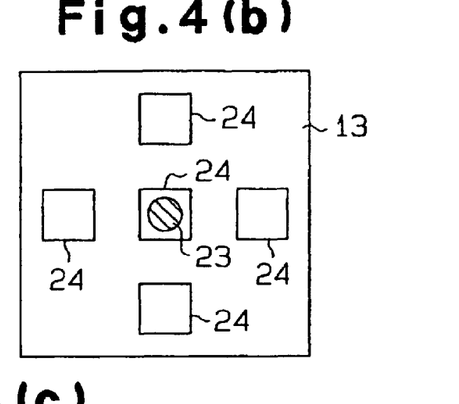
FIG. 4(b) is a plan view illustrating the position of a Hall element.
Figure 4C:
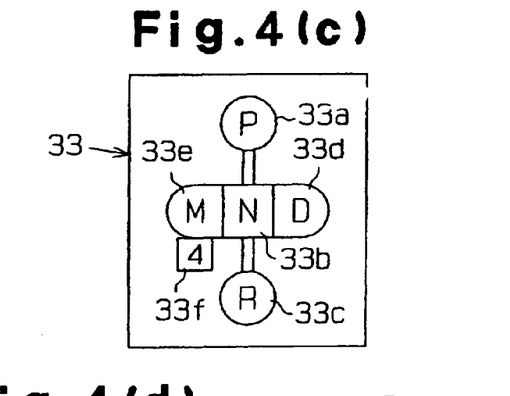
FIG. 4(c) is a front view illustrating a shift position indicator.
Figure 4D:
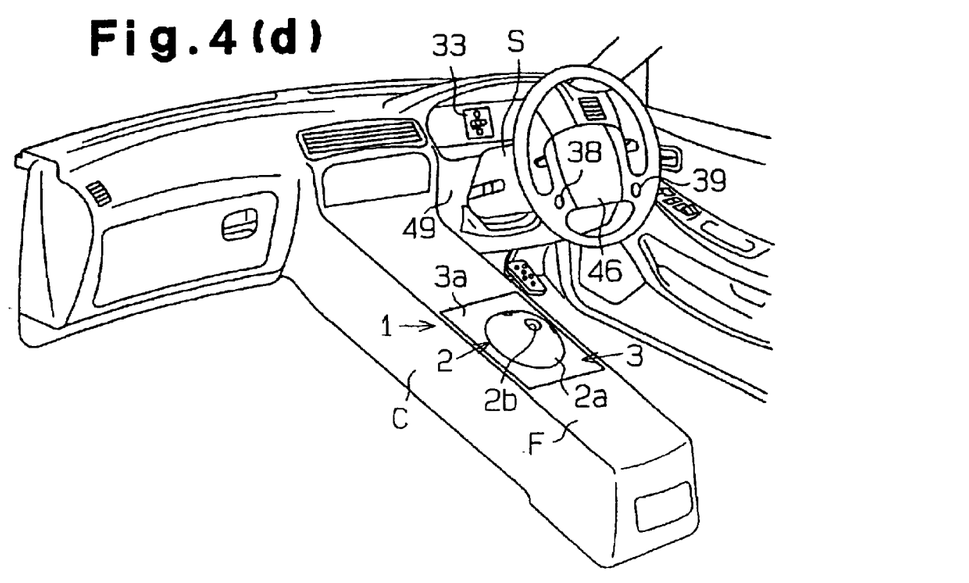
FIG. 4(d) is perspective view illustrating the front part of a vehicle passenger compartment.

As shown in FIG. 4(d), a shift device 1 is integrally attached to a floor console F. The shift device 1 has a substantially dome-shaped semispherical knob 2, which is substantially located in the same plane as the floor console F. The semispherical knob 2 is moved in forward, rearward, leftward and rightward directions of the vehicle (crossing directions). The semispherical knob 2 is arranged such that the center position in the cross (a selected position S0, which will be described below) is inclined rearward (toward the driver). As shown in FIGS. 1 and 2, the shift device 1 has a case 3. A substantially circular hole 3b is formed in an upper wall 3a of the case 3. A part of the semispherical knob 2 projects from the case 3 so that an upper surface 2a of the knob 2 bulges into the passenger compartment from the hole 3b.

There are stationary type shift devices and momentary type shift devices. In a stationary type shift device, an operational member remains at a selected position when an applied force is released. In a momentary type shift device, an operational member moves back to a reference position when an applied force is released. The shift device of this embodiment is a stationary type, in which the semispherical knob 2 remains at a selected position when the driver separates a hand from the knob 2.

As shown in FIGS. 1 and 2, the shift device 1 has the semispherical knob 2, the case 3, a holder 4, a holder case 5, a shaft 6, a manipulation body 7, a pin 11, a support plate 12, an ECU board 13, a stopper plate 15, and a solenoid 16. The stopper plate 15 and the solenoid 16 form locking means. The semispherical knob 2, the shaft 6, the manipulation body 7, the pin 11, and the support plate 12 form a selection operation member. FIG. 2 shows a state in which the semispherical knob 2 is located at a selected position S1, which corresponds to a reverse state P, and the shaft 6 is upright.

The sidewalls of the holder case 5 are attached to the case 3. An accommodation recess 4a and front, rear, left and right guide grooves 4b are formed in the holder 4. The guide grooves 4b are formed along a circle and located at spaced at equal intervals from one another.

The shaft 6 has a spherical portion 6a substantially at the center, an upper shaft portion 6b extending upward from the spherical portion 6a, and a lower shaft portion 6c extending downward from the spherical portion 6a. Four guide projections 6d are formed on the spherical portion 6a and located on an imaginary cross. The guide projections 6d are located in a plane that includes the center of the spherical portion and is perpendicular to the direction of the upper shaft portion 6b (vertical direction).

The spherical portion 6a is rotatably and slidably accommodated in the accommodation recess 4a such that each guide projection 6d is engaged with one of the guide grooves 4b. The spherical portion 6a is rotated within a predetermined angle by an aligned pair of the guide projections 6d slide along the corresponding guide grooves 4b while the other aligned pair of the guide projections 6d is horizontally supported by the corresponding guide grooves 4b. Rotation of the spherical portion 6a inclines the shaft 6 forward, rearward, leftward and rightward.

The holder case 5 is shaped like a box and covers the upper surface and the sides of the holder 4. A hole 5b is formed in the center of an upper wall 5a of the holder case 5. The upper wall 5a is engaged with the spherical portion 6a at the perimeter of the hole 5b and prevents the spherical portion 6a from escaping from the accommodation recess 4a.

As shown in FIG. 2, the substantially cup-shaped manipulation body 7 is fitted to the upper shaft portion 6b. The manipulation body 7 has a recess. The recess of the manipulation body 7 is divided into a large diameter portion 7b and a small diameter portion 7c. The upper shaft portion 6b is fitted in the small diameter portion 7c. The manipulation body 7 is urged upward by a spring 21 located between the spherical portion 6a and the large diameter portion 7b. Four engage projection 7d are formed in the lower perimeter of the manipulation body 7. The engage projections 7d are located on a cross. A push button 7e is formed at the upper end of the manipulation body 7.

The size of the semispherical knob 2 is substantially the same as the size of a palm of the driver. A hole 2b is formed in the upper surface 2a of the knob 2. The push button 7e protrudes through the hole 2b. The semispherical knob 2 contacts the manipulation body 7 at the perimeter of the hole 2b. The semispherical knob 2, together with the manipulation body 7, is urged upward by the force of the spring 21. The upper wall 3a contacts the semispherical knob 2 at the perimeter of the hole 3b and prevents the semispherical knob 2 from escaping from the case 3.

A holes 2c–2e are formed on the upper surface 2a of the knob 2. The holes 2c–2e are located about the hole 2b. When the driver lays a hand (the left hand in this case) on the upper surface 2a such that the palm is aligned with the hole 2b, the thumb, the middle finger, and the ring finger can be hooked with the holes 2c–2e, respectively. Four engage projections 2f–2i project from the lower periphery of the semispherical knob 2. The projections 2f–2i are spaced by equal angular intervals. The projections 2f–2i project downward from the lower periphery of the semispherical knob 2. The left and right projections 2h, 2i projects further downward than the front and rear projections 2f, 2g.

The semispherical knob 2 is inclined in crossing directions, or forward, rearward, leftward, and rightward, from the central selected position S0 (a neutral position N). Accordingly, the gear is shifted. That is, the shift device 1 is shifted to one of five positions, or the central selected position S0, a front first selected position S1, a rear second selected position S2, a left third selected position S3, and right fourth selected position S4. Each selected position S0–S4 corresponds to one of the engage states (N, P, R, M, D) of a gear train, which will be discussed below.

A detent portion 3d is formed on the bottom 3c of the case 3. The detent portion 3d has five recesses, which are arranged in a cross for holding the shaft 6 at the selected positions S0–S4. A hole 6e is formed in the lower shaft portion 6c. A hollow cylindrical pin 11 is accommodated in the hole 6e. The pin 11 has a hollow 11a, an opened upper end, and a substantially spherical lower end. A spring 22 is accommodated in the hollow 11a of the pin 11. The spring 22 urges the pin 11 downward so that the pin 11 contacts the detent portion 3d.

A flat support plate 12 is located below the holder case 5. The support plate 12 is supported by a support 3e formed on the bottom 3c such that the plate 12 moves forward, rearward, leftward, and rightward. The support plate 12 has a hole 12a formed in the center. The hole 12a loosely receives the lower shaft portion 6c. A magnet 23 is attached to the front lower side of the support plate 12. When the semispherical knob 2 is manipulated forward, rearward, leftward, or rightward so that the shaft 6 is inclined, the support plate 12 and the magnet 23 are moved in accordance with the movement of the semispherical knob 2.

The ECU board 13 is supported by the support 3e and is located below and slightly spaced from the support plate 12. As shown in FIG. 4(b), five hall elements 24 are located in a cross on the ECU board 13. The hall elements 24 face the magnet 23. A connector portion 25 is located on the ECU board 13. When the magnet 23 approaches any one of the hall elements 24, the hall element 24 send an output signal to an SBW-ECU 31 (an electronic control unit for controlling shifting, see FIG. 5). A selection state detection device includes the support plate 12, the ECU board 13, the magnet 23, the hall elements 24, and the SBW-ECU 31. The magnet 23 and the hall elements 24 form a position sensor.

Figure 3:
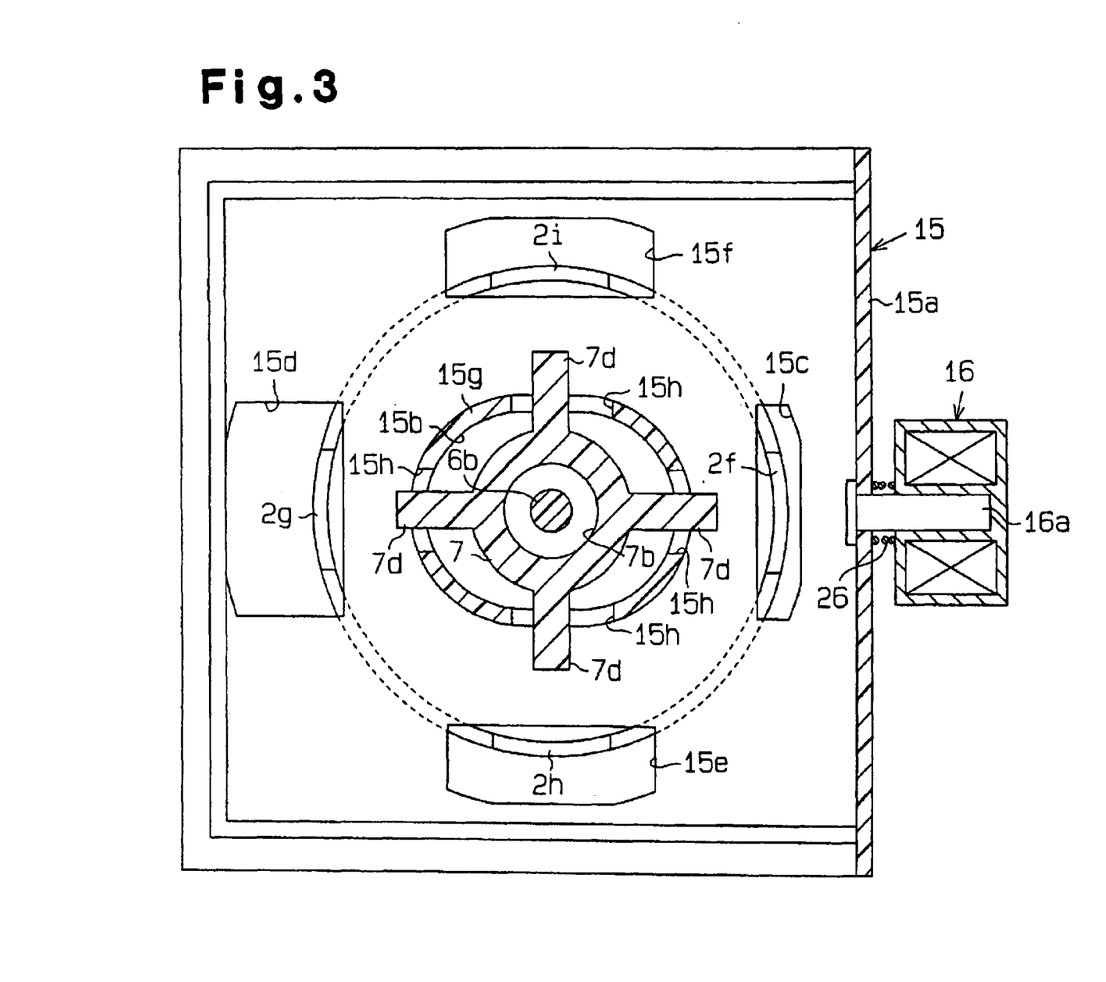
FIG. 3 is a cross-sectional view taken along line 3–3.

As shown in FIGS. 1 to 3, a stopper plate 15 is located below the semispherical knob 2. The stopper plate 15 is supported by the case 3 with a guide rail 3f, which extends in the front and rear direction. The stopper plate 15 is moved between a front first position (a right position as viewed in FIG. 2) and a rear second position for locking the semispherical knob 2. In FIGS. 2 and 3, the stopper plate 15 is at the first position. A solenoid 16 having a plunger 16a is located at the front side of the stopper plate 15. The stopper 15 is supported by a support extending from the case 3. The plunger 16a moves in the front and rear direction. The distal end of the plunger 16a is engaged with a front end 15a of the stopper plate 15. A spring 26 is fitted about the plunger 16a. The spring 26 urges the stopper plate 15 rearward (leftward as viewed in FIG. 2). When the solenoid 16 is excited, the stopper plate 15 is moved to the front first position. When the solenoid 16 is de-excited, the stopper plate 15 is moved to the rear second position.

The stopper plate 15 has a hole 15b formed in the center. The diameter of the hole 15b is greater than the diameter of the manipulation body 7. The manipulation body 7 extends through the hole 15b. Elongated holes 15c–15f are formed in the stopper plate 15 and are located in front of, behind, on the left side of, and on the right side of the hole 15b, respectively. The elongated holes 15c–15f correspond to the engage projections 2f–2i, respectively. The projections 2h, 2i always extend through the left and right elongated holes 15e, 15f, respectively. In the state shown in FIGS. 2 and 3, the lower ends of the projections 2f, 2g are aligned with the upper surface of the stopper plate 15 and are not located in the elongated holes 15c, 15d.

As shown in FIGS. 2 and 3, a substantially annular rim 15g project downward from the stopper plate 15 and surrounds the hole 15b. Four engage recesses 15h are formed in the front, rear, left, and right sections of the rim 15g. Each recess 15h engages with one of the four engage projections 7d. When the semispherical knob 2 is located at the selected position S1 (a position that corresponds to a parking state P), the rear engage projection 7d engages with the corresponding engage recess 15h as shown in FIG. 2. When the semispherical knob 2 is located at the selected position S2 (a position that corresponds to a reverse state R), the front engage projection 7d engages with the corresponding engage recess 15h.

Figure 5:
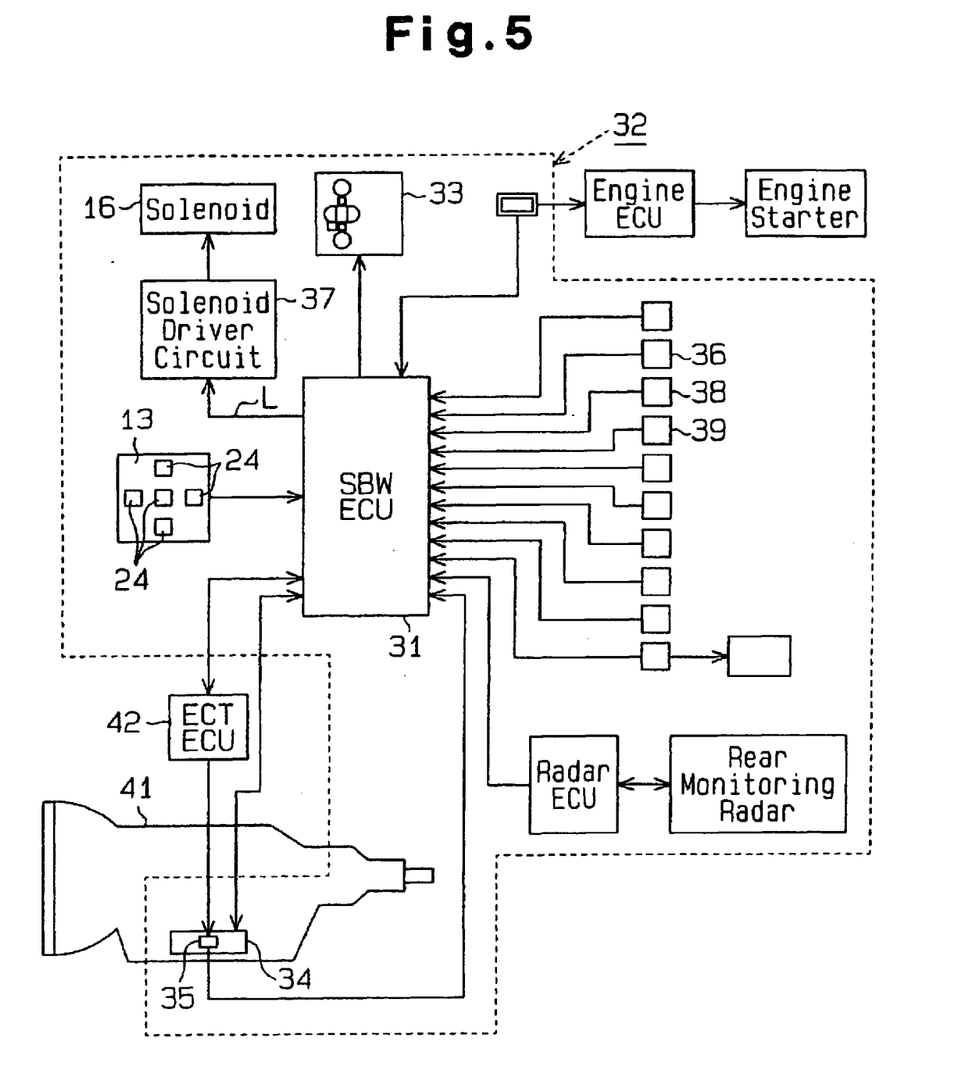
FIG. 5 is a block diagram showing a controller for a transmission.

As shown in FIG. 5, a controller 32 of the transmission includes the shift device 1, the SBW-ECU 31, a shift position indicator 33, a hydraulic actuator 34 for shifting, a range position detector 35, a brake switch 36, a solenoid driver circuit 37, a manual shift-up switch 38, and a manual shift-down switch 39.

The hydraulic actuator 34 consists a part of an automatic transmission 41 (hereinafter referred to as transmission). The actuator 34 includes electromagnetic valves (not shown), which are controlled by electric signals. The electromagnetic valves control hydraulic oil supplied from a hydraulic pump, thereby changing the engage state of the gear train. The engage state of the gear train is selected among the neutral state N, the parking state P, the reverse state R, an automatic shift drive state D, and a manual shift drive state M.

The range position detection device 35 is located in the housing of the transmission 41, and detects the engage state (P, R, N, D (M)) of the gear train and sends a detection signal to the SBW-ECU 31.

The SBW-ECU 31 includes a microcomputer (not shown). The microcomputer performs previously stored control programs for controlling the hydraulic actuator 34. Accordingly, the engage state of the gear train is shifted. The SBW-ECU 31 controls the hydraulic actuator 34 based on manipulation signals from the shift device 1 and detection signals from the detector 35.

As shown in FIG. 4(c), the shift position indicator 33 has a parking display 33a for indicating that the transmission 41 is in the parking state P, a neutral display 33b for indicating that the transmission 41 is in the neutral state N, a reverse display 33c for indicating that the transmission 41 is in the reverse state R, and a drive display 33d for indicating that the transmission 41 is in the drive sate D. The shift indicator 33 further includes a manual mode display 33e for indicating that the transmission 41 is in the manual drive state M, and a gear display 33f for showing the gear selected in the manual transmission mode. The gear display 33f shows the selected gear by numerals 1–4.

The brake switch 36 sends a brake signal to the SBW-ECU 31 when the brake pedal is depressed. As shown in FIG. 4(d), the manual shift-up switch 38 and the manual shift-down switch 39 are located on the steering wheel 46. When the engage state of the transmission 41 is changed to the manual drive state M, the manual shift-up switch 38 sends a signal for shifting up the transmission to the SBW-ECU 31. The manual shift-down switch 39 sends a signal for shifting down to the SBW-ECU 31.

The operation of the shift mechanism will now be described.

Figure 6:
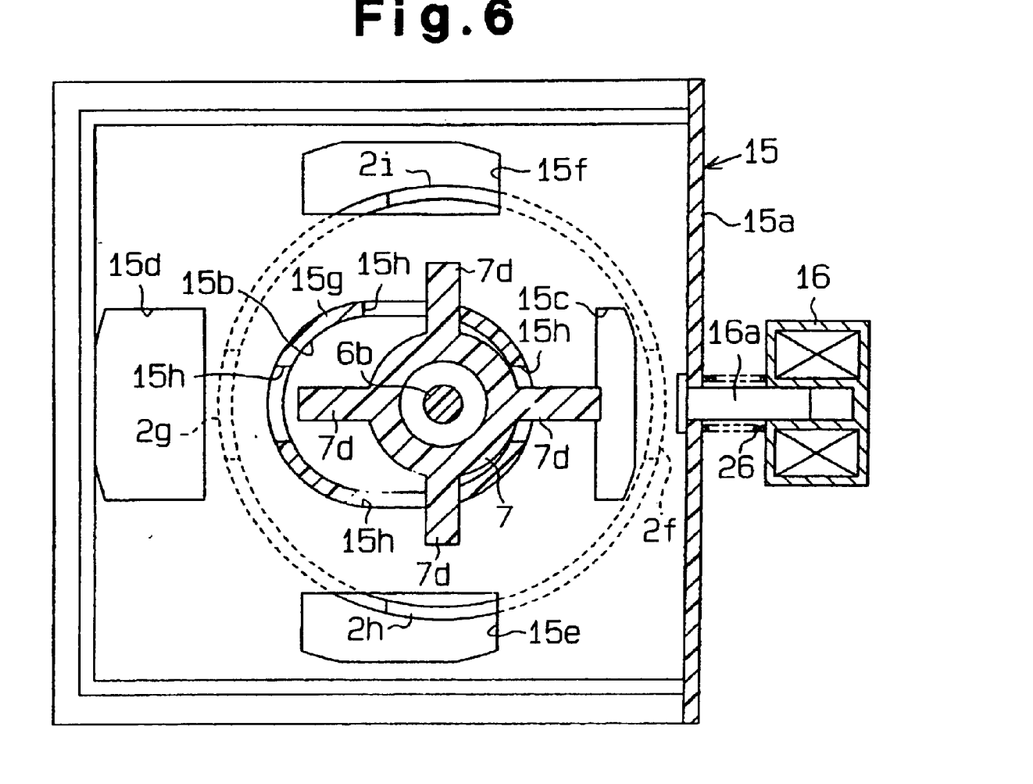
FIG. 6 is a cross-sectional view illustrating a selector device when a semispherical knob is locked.

When the semispherical knob 2 is at the selected position S1 (parking state P), the SBW-ECU 31 sends a lock signal L to the solenoid driver circuit 37. Accordingly, the solenoid 16 is de-excited, and the stopper plate 15 is moved to the rear second position as shown in FIG. 6 by the force of the spring 26. In this state, the engage projections 2f, 2g engage with the upper surface of the stopper plate 15, which locks the semispherical knob 2 against moving to the other selected positions S0, S2–S4 (parking lock state).

If the brake pedal is depressed in this state, the lock signal L is stopped, and the solenoid driver circuit 37 excites the solenoid 16. Then, as shown in FIGS. 2 and 3, the plunger 16a is moved forward and the stopper plate 15 is moved to the first position, which unlocks the semispherical knob 2.

When shifting the transmission 41, the driver lays the left hand on the semispherical knob 2 in the state shown in FIG. 2 and presses the button 7e with the palm. This moves the manipulation body 7 downward and disengages the engage projections 7d from the engage recesses 15h. The semispherical knob 2 therefore can be moved to any selected position. While continuously pressing the button 7e, the driver hooks the thumb, the middle finger, and the ring finger to the holes 2c–2e, respectively. In this state, the driver tilts the semispherical knob 2. For example, if the semispherical knob 2 is tilted rearward (toward the driver) from the first selected position S1 (parking state P), the pin 11 is disengaged from a recess of the detent portion 3d that corresponds to the selected position S1. The pin 11 then engages an adjacent recess, the semispherical knob 2 is then inclined to the selected position S0 (neutral state N). Based on electric signals from the shift device, 1, the SBW-ECU 31 changes the engage state of the gear train to the neutral state N.

If the driver removes the hand from the semispherical knob 2 and releases the button 7e, the manipulation body 7 is moved upward by the force of the spring 21, which engages the projections 7d with the recesses 15h. Accordingly, the semispherical knob 2 is held against tilting.

If the driver lays the hand on the semispherical knob 2 again and tilts the semispherical knob 2 rearward, the pin 11 is engaged with the next recess of the detent portion 3d. The semispherical knob 2 is then inclined to the selected position S2 (the reverse state R). Accordingly, the engage state of the gear train is changed to the reverse state R. Even if the driver removes the hand from the semispherical knob 2 to release the button 7e, the semispherical knob 2 is held at the selected position S2.

If the semispherical knob 2 is inclined to the selected position S4, the gear train is switched to the drive state D. The drive state D refers to a state in which one of several engage states having different gear ratios is automatically selected in the gear train. In the automatic drive mode, an electronic control transmission control unit (ECT-ECU) 42, which is connected to the SBW-ECU 31, switches the engage state of the gear train based on the vehicle speed and the throttle opening degree. When the knob 2 is inclined to the selected position S3, the gear train is switched to the drive state M of the manual transmission mode. In this state, the engage state of the gear train is switched by manipulating the manual shift-up switch 38 and the manual shift-down switch 39.

When the semispherical knob 2 is shifted again to the selected position S1 (the parking state P), the engage state of the gear train is switched to the parking state P, and the solenoid 16 is de-excited. Accordingly, the stopper plate 15 is moved to the second position as shown in FIG. 6, and the semispherical knob 2 is locked (parking lock).

The above embodiment provides the following advantages.

(1) Part of the semispherical knob 2, which is substantially dome shaped, protrudes from the upper wall 3a of the case 3. Therefore, compared to conventional shift levers, the knob 2 protrudes into the passenger compartment by a smaller amount. This structure prevents the shift device 1 from being unintentionally manipulated by the driver.

(2) The semispherical knob 2 is substantially dome shaped. Therefore, when a hand accidentally hits the knob 2, the hand is less likely to get hooked with the knob 2 compared to conventional shift levers. This further prevents the shift device 1 from being unintentionally manipulated by the driver.

(3) The semispherical knob 2 is manipulated by engaging fingers with the holes 2c–2e. Therefore, although the knob 2 scarcely protrudes into the passenger compartment, the manipulation is easy.

(4) When the button 7e is pressed, the engage projections 7d are disengaged from the engage recesses 15h, which permits the semispherical knob 2 to be inclined. Thus, the semispherical knob 2 is manipulated in two steps (pressing of the button 7e and inclining of the semispherical knob 2). This further prevents the shift device 1 from being unintentionally manipulated by the driver.

(5) When the semispherical knob 2 is located at the selected position S1 (the parking state P), the solenoid 16 is de-excited. In this state, the stopper plate 15 is moved to the second position and is engaged with the engage projections 2f, 2g, which locks the stopper plate 15 against being manipulation. Accordingly, the structure for limiting the inclination of the semispherical knob 2 is simple.

The above illustrated embodiment may be modified as follows.

Figure 7:
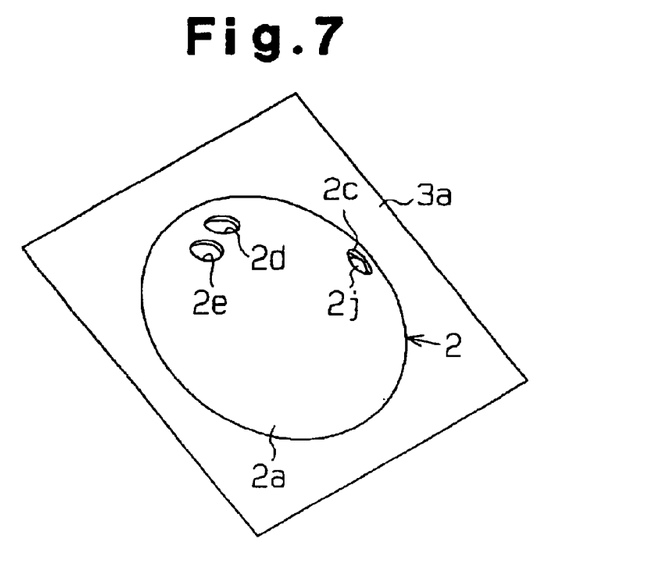
FIG. 7 is perspective view illustrating a spherical knob according to a modified embodiment.

As shown in FIG. 7, a switch portion 2j, which functions as a button, may be located in any one of the holes 2c–2e (for example, in the hole 2c) of the semispherical knob 2. In this case, when the switch portion 2j is manipulated, a select signal of the engage state of the gear train, which is generated based on the manipulation of the semispherical knob 2, is made effective by the SBW-ECU 31. For example, five AND circuits are located on the ECU board 13. Signals from each hall element 24 and the switch portion 2j are inputted into the corresponding AND circuit. The output of the AND circuit is sent to the SBW-ECU 31. In this case, the semispherical knob 2 is manipulated in three steps, which includes the aforementioned two steps and the manipulation of the switch portion 2j. This further prevents the shift device 1 from being unintentionally manipulated by the driver.

In the above case, a switch portion 2j may be located in each of the holes 2c–2e, and the select signal of the engage state of the gear train may be made effective when all the switch portion 2j are pressed. In this case, unintentional manipulation of the shift device 1 by the driver is further prevented.

Instead of providing the button 7e in the semispherical knob 2 or providing a mechanical inner structure such as the shift device 1, the following structure may be applied for permitting the semispherical knob to be more freely moved to any selected position. For example, a support may be attached to the bottom of the case, and a recess may be formed in the upper surface of the support. In this case, a substantially spherical support member is accommodated in the recess, and a semispherical knob having a switch portion 2j is supported on the support member. The friction between the support and the support member is set significantly greater than the friction between the semispherical knob and the support member so that the support member usually does not rotate relative to the support when the semispherical knob is manipulated. Magnets are attached to the front, rear, left and right portions of the lower end portion of the semispherical knob 2. An annular projection is formed on the support member to surround the support member. A hall element is attached to each location that faces one of the magnets on the annular projection. In this case, an output signal generated by manipulation of the semispherical knob may be determined to be effective through two steps, or manipulation of the semispherical knob and manipulation of the switch portion 2j.

In the above case, the initial settings of the semispherical knob may be flexible. For example, in the parking state P, the driver may incline the semispherical knob according to his/her preference, and that inclined position may be set as a new position of the parking state P. In this case, an engage pin is attached to the semispherical knob, and an engage recess is formed at a location facing the engage pin. When the initial settings of the semispherical knob are changed, the engage pin is engaged with the engage recess. As the semispherical knob is inclined, the support member is rotated, thereby changing the initial settings.

In the above illustrated embodiment, the shift device is stationary type. However, the shift device may be a momentary type, which returns to a reference position when manipulation force is released. In this case, the selected position S0 is set as the reference position. No selected state of the gear train is assigned to the reference position. Instead of the dive state M of the manual drive mode, the neutral state N is assigned to the selected position S3. When the semispherical knob 2 is moved from the reference position to any of the selected positions S1–S4, a signal for changing the engage state of the transmission 41 is generated.

The semispherical knob 2 may be locked without using the stopper plate 15. For example, a locking recess may be formed on the spherical portion 6a, and a locking pin may be attached to the plunger of the solenoid. In this case, the shaft 6 and the semispherical knob 2 are locked by engaging the locking pin with the locking recess. In this case, for example, the semispherical knob may be locked based on a signal from the vehicle speed sensor when the vehicle is in the drive state D or the reverse state R and moving at a speed that is equal to or higher than a predetermined level.

In the above illustrated embodiment, the shift device 1 is located on the floor console F. However, the shift device 1 may be located on a column S (see FIG. 4(d)). Alternatively, the shift device 1 may be located on an instrument panel 49 (see FIG. 4(d)). In these cases, to reduce the projecting amount of the shift device 1 into the passenger compartment, the mechanical structure of the shift device 1 is preferably simplified.

As a conventional shift lever, the semispherical knob 2 may be linearly manipulated. The position sensor detecting the selected state is not limited to the one that includes the magnets 23 and the hall elements 24. However, the position sensor may be a slide switch, a microswitch, or a photosensor.

Second Embodiment

A second embodiment of the present invention will now be described with reference to FIGS. 8 to 10.

Figure 8:
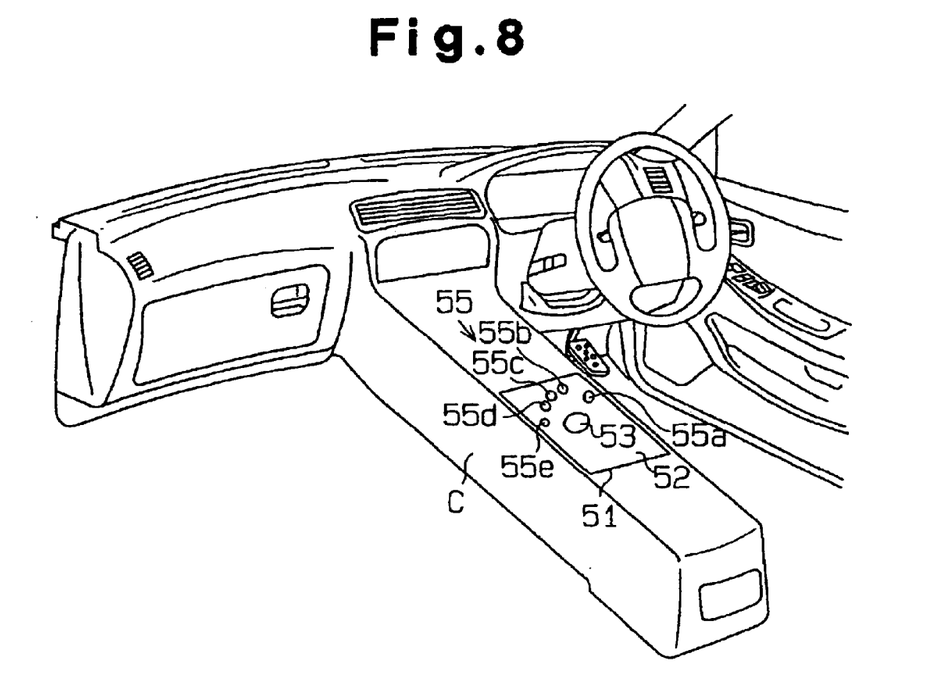
FIG. 8 is a perspective view illustrating a switch device according to a second embodiment.

As shown in FIG. 8, a switch device 51 of a shift switch is installed in a floor console C. The switch device 51 includes a base plate portion 52. A palm rest 53, which functions as a resting portion, projects from the base plate portion 52. The driver lays hand on the palm rest 53 while in the driving posture. At positions where fingers are placed, push buttons 55, the number of which is five in this embodiment, project from the base plate portion 52. The buttons 55 conform a handprint. When pushed, each push button 55 outputs an ON signal.

Figure 9A:
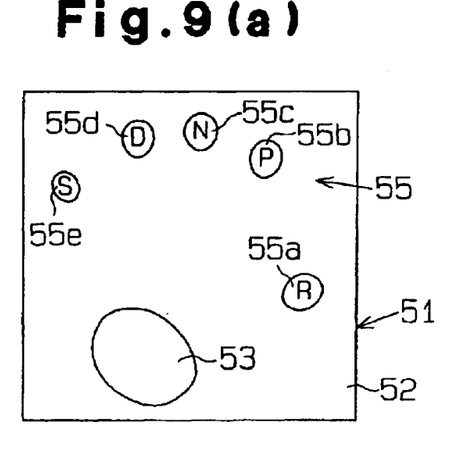
FIG. 9(a) is a plan view illustrating a switch device.

As shown in FIG. 9(a), the push button switches 55 include an R button switch 55a for the reverse state, a P button switch 55b for the parking state, an N button switch 55c for the neutral state, and a D button switch 55d for the drive state. The R button switch 55a is located at a position corresponding to the thumb. The P button switch 55b is located at a position corresponding to the index finger. The N button switch 55c is located at a position corresponding to the middle finger. The D button switch 55d is located at a position corresponding to the ring finger. The R button switch 55a, the P button switch 55b, the N button switch 55c, and the D button switch 55d form the first switch portion.

Other than the button switches 55a–55d, a second switch portion, which is an S button switch for preventing erroneous operation, is located at a position corresponding to the little finger. Manipulation signals from the button switches 55a–55e of the switch device 51 are sent to an SBW-ECU 54 (electronic control unit for controlling shifting), which functions as means for detecting selected state.

Figure 10:
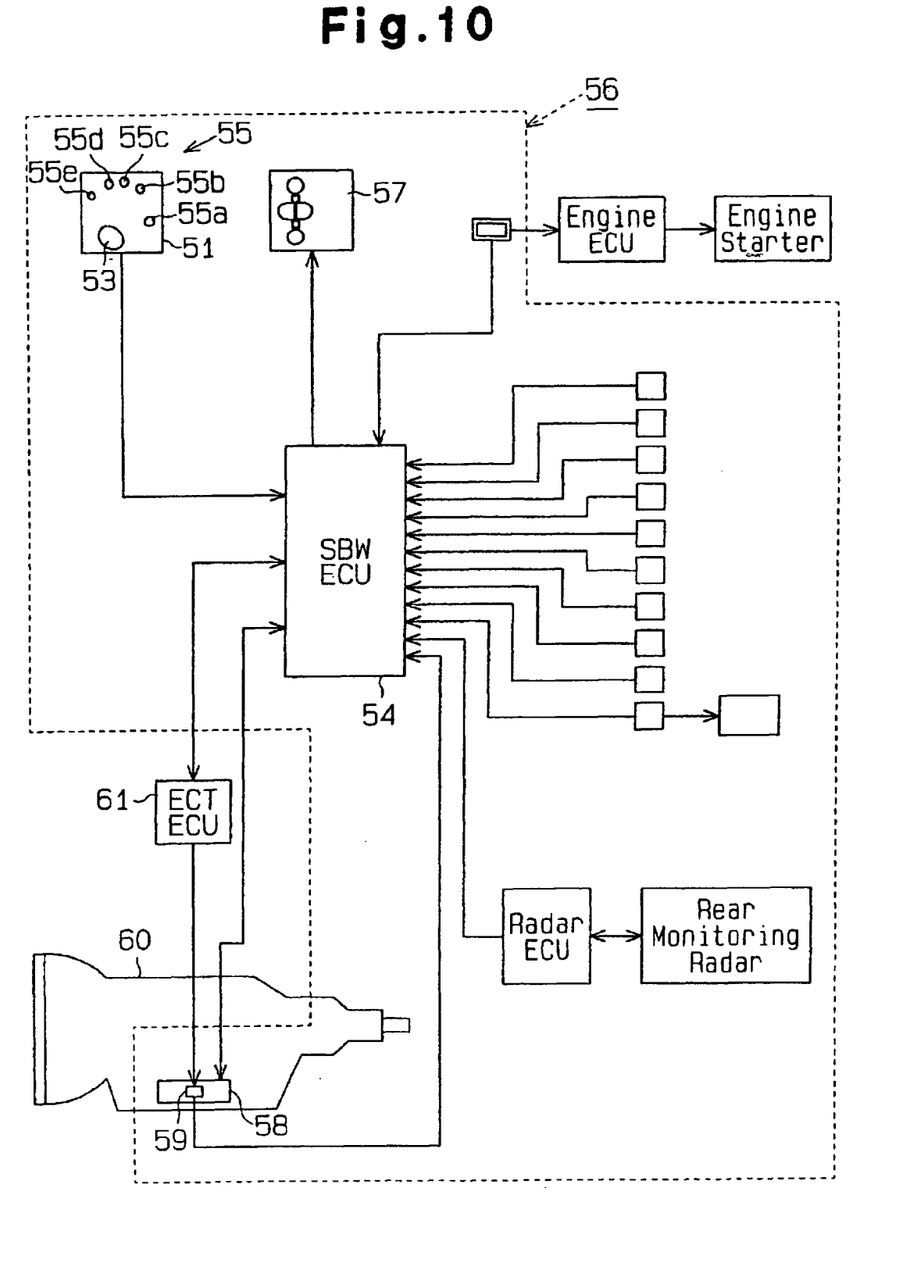
FIG. 10 is a block diagram showing a controller for transmission.

As shown in FIG. 10, a controller 56 for a vehicular transmission includes the SBW-ECU 54, the switch device 51, the shift indicator 57, an hydraulic actuator 58 for shifting, and a range position detection device 59.

The actuator 58 consists a part of an automatic transmission 60 (herein after referred to as transmission) and includes electromagnetic valves (not shown), which are controlled by electric signals. The electromagnetic valves control hydraulic oil supplied from a hydraulic pump, thereby changing the engage state of the gear train. The engage state of the gear train is switched among the neutral state N, the parking state P, the drive state D, and the reverse state R.

The range position detection device 59 is located in the housing of the transmission 60, and detects the engage state (P, R, N, D) of the gear train and sends a detection signal to the SBW-ECU 54.

The SBW-ECU 54 includes a microcomputer (not shown). The microcomputer performs previously stored control programs for controlling the hydraulic actuator 58. Accordingly, the engage state of the gear train is shifted. The SBW-ECU 54 controls the hydraulic actuator 58 based on manipulation signals from the switch device 51 and detection signals from the range position detection device 59.

Figure 9B:
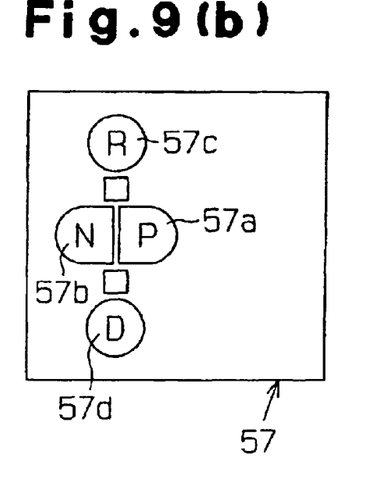
FIG. 9(b) is a diagram showing a position indicator.

As shown in FIG. 9(b), the shift position indicator 57 has a parking display 57a for indicating that the transmission 60 is in the parking state P, a neutral display 57b for indicating that the transmission 60 is in the neutral state N, a reverse display 57c for indicating that the transmission 60 is in the reverse state R, and a drive display 57d for indicating that the transmission 60 is in the drive sate D.

The shift position indicator 57 controls the displays 57a–57d in accordance with control signals sent from the SBW-ECU 54. The parking display 57a is lit when the SBW-ECU 54 determines that the transmission 60 is in the parking state P. The neutral display 57b is lit when the SBW-ECU 54 determines that the transmission 60 is in the neutral state N. Likewise, the reverse display 57c is lit when the SBW-ECU 54 determines that the transmission 60 is in the reverse state R. The drive display 57d is lit when the SBW-ECU 54 determines that the transmission is in the drive state D.

The operation of the switch device 51 will now be described.

Based on a signal from any one of the D button switch 55d, the N button switch 55c, the P button switch 55b, the R button switch 55a of the switch device 51, and a signal from the S button switch 55e for preventing erroneous manipulation, the SBW-ECU 54 generates a control signal for switching the engage state of the transmission 10.

If the S button switch 55e at the position of the little finger and the P button switch 55b at the position of the index finger are pressed with the brake pedal pressed when the transmission 60 is in the parking state P, the signals from the buttons switches 55e, 55b are sent to the SBW-ECU 54. The SBW-ECU 54 determines that the signals are valid and cancels the shift lock state.

When the engage state of the transmission 60 is changed to any one of the selected state after the parking state P is cancelled, a signal based on pressing of the S button switch 55e for preventing erroneous manipulation is sent to the SBW-ECU 54. When the S button switch 55e is pushed, any one of the R button switch 55a at the thumb position, the N button switch 55c at the middle finger position, the D button switch 55d at the ring finger position is pushed, and a signal based on the pressing is sent to the SBW-ECU 54. At this time, the signals are sent to the SBW-ECU 54 regardless whether a manipulation for switching the engage state of the transmission is valid or invalid. Whether the signals are valid or invalid for switching the engage state of the transmission 60 is determined by the SBW-ECU 54. When the signals are valid, the engage state of the transmission 60 is switched.

When the reverse state R is selected, the S button switch 55e at the little finger position and the R button switch 55a at the thumb position are pushed. Accordingly, the transmission 60 is switched to the reverse state R.

When the neutral state N is selected, the S button switch 55e at the little finger position and the N button switch 55c at the middle finger position are pushed. Accordingly, the transmission 60 is switched to the neutral state N. At this time, the transmission 60 can be switched to the neutral state N from any one of the reverse state R, the drive state D. Also, the transmission 60 can be switched to the neutral state N from the parking state P after canceling the shift lock. Also, the transmission 60 can be switched from the neutral state N to either of the reverse state R or the drive state D. Further, the transmission 60 can be switched from the neutral state N to the parking state P after the shift lock is cancelled.

When the drive state D is selected, the S button switch 55e at the little finger position and the D button switch 55d at the ring finger position are pushed. Accordingly, the transmission 60 is switched to the drive state D. When the transmission 60 is in the drive state, an electronic control transmission control unit (ECT-ECU) 61, which is connected to the SBW-ECU 54, switches the engage state of the gear train based on the vehicle speed and the throttle opening degree.

When the parking state P is selected, the SBW-ECU 54 permits the transmission 60 to be switched to the parking state P from one of the neutral state N, the reverse state R, and the drive state D after determining that the vehicle is not moving. Then, the S button switch 55e at the little finger position and the P button switch 55b at the index finger position are pushed. Accordingly, the transmission 60 is switched to the parking state P. Thereafter, in the parking state P, the shift is locked by removing the key from the engine switch (not shown).

The switch device 51 needs to prevent the transmission 60 from being switched by a signal that is generated based on an unintentional manipulation of the driver. Thus, such signals, if generated, are invalidated. That is, since the switch device has the S button switch 55e for preventing erroneous manipulations, the engage state of the transmission 60 is switched through two steps: pressing of the S button switch 55e and pressing of one of the button switches 55a–55d. Therefore, the transmission 60 is prevented from being unintentionally operated. When the transmission 60 is manipulated to directly switch from the drive state D to the reverse state R or from the reverse state R to the drive state, the SBW-ECU 54 determines the signal generated based on the manipulation is invalid. If the SBW-ECU 54 determines that the signal is invalid, the engage state before the manipulation is maintained.

When the vehicle is moving, even if the transmission 60 is manipulate to switch from the drive state D to the parking state P or from the parking state P to the drive state D, a signal generated based on the manipulation is determined to be invalid by the SBW-ECU 54.

This embodiment provides the following advantages.

(1) By laying a hand on the palm rest 53, the fingers are arranged at predetermined positions. This facilitates switching operation and permits the driver to perform the switching without looking at the switches.

(2) The switch device 51 has the push buttons 55. Compared to a case where switches that are turned on simply by touching, the push buttons 55 less likely outputs erroneous signals and allows the driver to comfortably perform switching.

(3) The switch device 51 has the S button switch 55e for preventing erroneous manipulations. This prevents the transmission 60 from being unintentionally manipulated by the driver.

(4) The palm rest 53 projects from the base plate portion 52. Compared to a structure where only the position of the palm rest 53 is marked on the flat base plate portion 52, the illustrated embodiment facilitates switching.

The above illustrated embodiment may be modified as follows.

Figure 11:
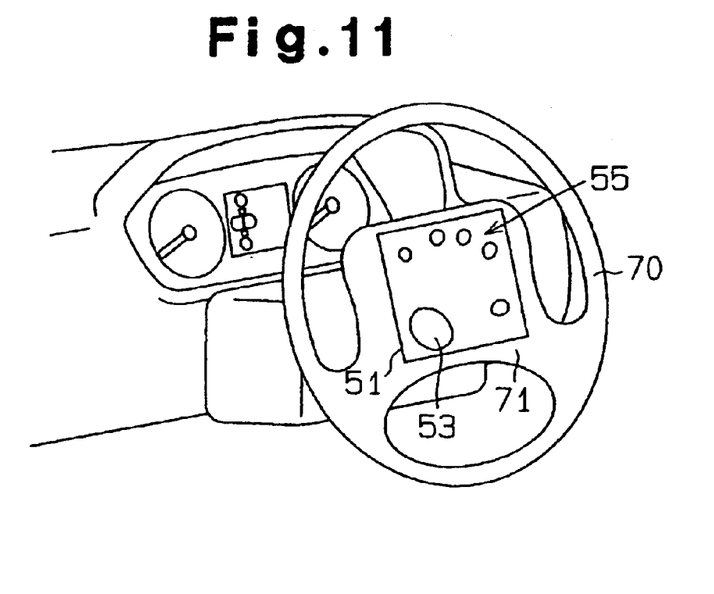
FIG. 11 is a perspective view illustrating a switch device according to a modified embodiment.

In the second embodiment, the switch device 51 is located on the floor console C. However, as shown in FIG. 11, the switch device 51 may be located on a horn cover 71 of the steering wheel 70. In this case, the force required for operating the switch device 51 must not interfere with operation of the horn. This modification has the same advantages as the second embodiment.

Figure 12:
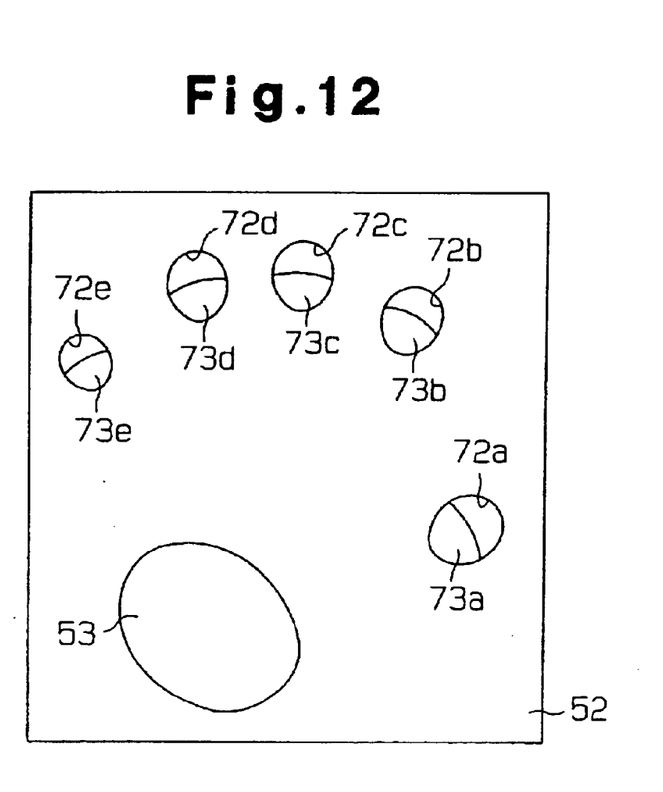
FIG. 12 is a plan view illustrating a switch device according to a modified embodiment.

In the second embodiment, the button switches 55a–55e protrude from the base plate portion 52. However, as shown in FIG. 12, recesses 72a–72e may be formed at positions corresponding to the positions of the fingers, and button switches 73a–73e may be located in the recesses 72a–72e, respectively. When the driver bends any finger inward, the corresponding button 73a–73e is pressed. This modification prevents the switch device from being unintentionally manipulated by the driver.

Figure 13A:
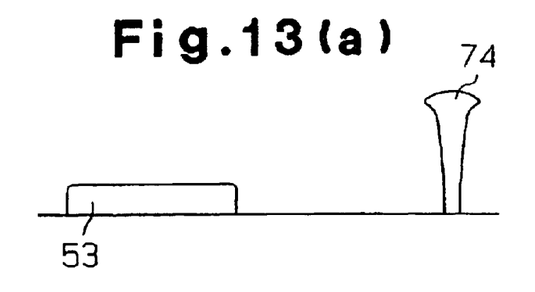
FIG. 13(a) is side view illustrating a modified embodiment.
Figure 13B:
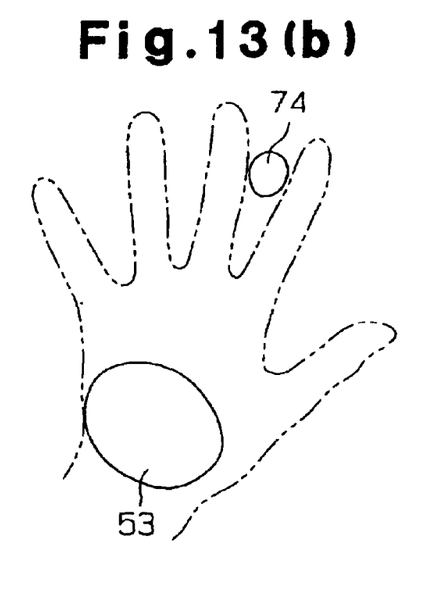
FIG. 13(b) is a plan view illustrating the modified embodiment of FIG. 13(a)

As shown in FIGS. 13(a) and 13(b), the button switches 55a–55d, which function as a first switch portion, may be replaced by a lever 74, which is manipulated by fingers, and the palm rest 53 may be replaced by a switch. Also, the S button switch 55e for preventing erroneous manipulation of the second embodiment may be omitted, and the palm rest 53 may function as a second switch portion. In this case, the lever 74 is a momentary type and can be inclined in crossing directions. The central position is the home position. When the driver moves a hand off the lever 74 after manipulation, the lever 74 returns to the home position.

Specifically, the lever 74 is shifted in the crossing directions, or shifted substantially forward, rearward, leftward, and rightward from the home position. Shifting of the lever 74 includes four manipulations: a manipulation from the home position to a right first position; a manipulation from the home position to a left second position; a manipulation from the home position to a lower third position; and a manipulation from the home position to an upper fourth position. At each selected position, a sensor for detecting that the lever 74 is moved from the home position to the position is provided. Each sensor sends a detection signal to the SBW-ECU 54. The lever 74 is easily operated by fingers. Also, the switch of the palm rest 53 and the lever 74 are simultaneously operated. This prevents the switch device from being unintentionally manipulated by the driver.

Figure 14A:
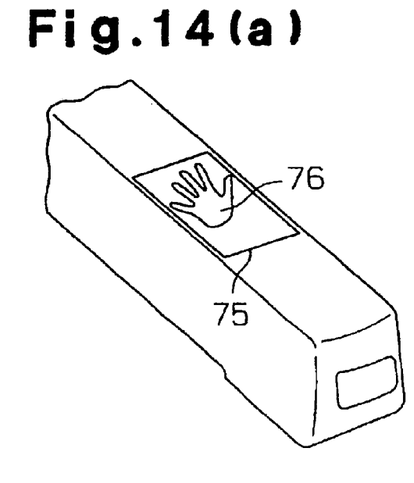
FIG. 14(a) is a perspective view illustrating a modified embodiment.

As shown in FIG. 14(a), a hand-shaped recess 76 may be formed on a switch device 75, and switches may be located at positions in the recess 76 that correspond to fingers. Since the positions of the fingers are fixed when the driver manipulates the switches, this modification further facilitates the driver to manipulate the switches without looking at the switches.

Figure 14B:
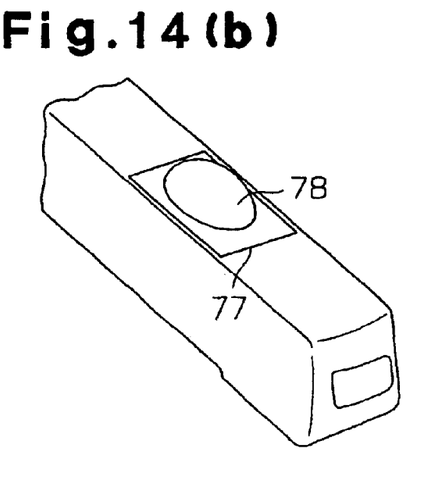
FIG. 14(b) is a perspective view illustrating the modified embodiment.

As shown in FIG. 14(b), a switch device 77 has a cover 78 that is made of a soft material. The cover 78 can be deformed by a hand. Switch portions are provided in the cover 78. In this case, a switch is pressed by pushing the cover 78 with a hand, which improves the appearance of the switch device 77.

An armrest may be provided at the driver's seat and the switch device 51 may be located in the armrest. Alternatively, the switch device 51 may be provided at other locations in the passenger compartment.

The palm rest 53 of the push button switches 55 shown in FIG. 11 may be replaced by a switch. For example, when the transmission is switched from the neutral state N to the drive state D, the palm rest 53 is first pressed. Then, the S button switch 55e for preventing erroneous manipulations at the little finger position and the D button switch 55d are manipulated. Since the operation includes three steps, unintentional manipulations of the switch device by the driver are prevented.

The S button switch 55e for preventing erroneous manipulations of the second embodiment may be omitted. In this case, the R button switch 55a, the P button switch 55b, the N button switch 55c, the D button switch 55d form a first switch portion, and the palm rest 53 forms a second switch portion. This modification has the same advantages as the second embodiment.

The S button switch 55e for preventing erroneous manipulations of the second embodiment may be used only when the engage state is switched to the reverse state R. For example, when the engage state is switched from the neutral state N to the reverse state R, the R button switch 55a and the S button switch 55e for preventing erroneous manipulations are simultaneously pressed. When the engage state is switched form the neutral state N to the drive state D, only the D button switch 55d is pressed. That is, a two-step operation is required for switching the engage state to the reverse state R, and a single-step operation is required for switching the engage state to any state other than the reverse state R. In this manner, the S button switch 55e is manipulated only when the reverse state R is selected. This reliably notifies the driver that the vehicle is in the reverse state R.

The S button switch 55e for preventing erroneous manipulations of the second embodiment may be used only when the engage state is switched to the reverse state R, and a switch may be provided in the palm rest 53. For example, when the engage state is switched from the neutral state N to the reverse state R, the R button switch 55a, the switch of the palm rest 53, and the S button switch 55e for preventing erroneous manipulations are simultaneously pressed. When the engage state is switched form the neutral state N to the drive state D, the D button switch 55d and the switch of the palm rest 53 are simultaneously pressed. That is, a three-step operation is required for switching the engage state to the reverse state R, and a two-step operation is required for switching the engage state to any state other than the reverse state R. Like the above modification, this modification reliably notifies the driver that the vehicle is in the reverse state R. Also, this modification prevents the switch device from being unintentionally manipulated by the driver.

In the second embodiment, the push buttons 55 are used. The buttons 55 may be replaced by touch panel type switches or pressure sensitive sensors. This modification improves the appearance of the switch device.

In the second embodiment, the R button switch 55a for the reverse state R is located at the thumb position, the P button switch 55b for the parking state is located at the index finger position, the N button switch 55c for the neutral state N is located at the middle finger position, the D button switch 55d for the drive state D is located at the ring finger position, and the S button switch 55e for preventing erroneous manipulations is located at the little finger position. However, for a car with a left-hand steering wheel, the arrangement of the push button switches 55 may be changed to facilitate manipulation by a right hand. This modification has the same advantages as the second embodiment.

In the second embodiment, a signal from the S button switch 55e for preventing erroneous manipulations and a signal from any one of the R button switch 55a, the P button switch 55b, the N button switch 55c, and the D button switch 55d are separately sent to the SBW-ECU 54. However, the switch device 51 may have AND circuits. In this case, a signal is sent to the SBW-ECU 54 when the S button switch 55e for preventing erroneous manipulations and another switch (for example, the R button switch 55a) are pressed.

The number of the button switches is not limited to five but may be changed a number six or greater or four or less. The correspondence between the finger positions and the shift positions may be changed. For example, instead of assigning the P button switch to the index finger position, the R button switch may be assigned to the index finger position.

Selected states other than the states P, R, N, and D may be added. Specifically, a drive state M of manual shift mode may be added. The manual drive state M is selected by pressing predetermined buttons. To change the shift position, a predetermined button switch is pressed.

The palm rest 53 may be replaced by a switch, and the number of the button switches may be changed to three. The three switches are a P button switch, an R button switch, and a D button switch. For example, the neutral state N is selected when the palm rest 53 and the button switches at three predetermined finger positions are simultaneously pressed. The drive state M may be selected when the palm rest 53 and the button switches at two predetermined finger positions are simultaneously pressed. The gear may be shifted up or down when a button at a predetermined finger position is pressed.

What is claimed is:

1. A shift device for operating a vehicular automatic transmission comprising:

a case;

a substantially dome-shaped knob, the knob being tiltable and selectivly located at selected positions that correspond engage states of the transmission, wherein a part of the knob protrudes from the case, wherein the knob has a central hole located at center thereof that corresponds a palm of a driver and a plarality of holes located around the central hole that correspond to fingers of the driver;

a stopper selectively located at a lack position where the tilt of the knob is locked and an unlock position where the lock of the knob is released;

a shaft tiltably supported by the case for holding the knob at the selected position;

a manipulation body movably supported by the shaft, wherein, in response to the movement of the shaft, the manipulation body is located at a protruded position where the manipulation body protrudes on the surface of the knob through the central hole, wherein the manipulation body has a projection that selectively engages and disengages with the stopper; and a spring that urges the manipulation body toward the protruded position;

wherein, when the manipulation body at the protruded position is pressed against the force of the spring while the stopper releases the knob from locking, the projection separates from the stopper to allow the tilt of the manipulation body, knob and the shaft, and when the manipulation body is released from pressing, the manipulation body engages the stopper.

2. The shift device according to claim 1, wherein a switching signal of the automatic transmission is outputted by a two-step operation including operation of the manipulation body and operation of the knob.

3. The shift device of claim 1, further comprising a detection device for detecting the selected state of shift position by the knob, wherein the detection device detects the selected state of the shift position when the manipulation body is operated.

* * * * *